US006507536B1

(12) United States Patent
Keatch

(10) Patent No.: US 6,507,536 B1
(45) Date of Patent: Jan. 14, 2003

(54) MOON-PHASE DIAL MECHANISM

(76) Inventor: Richard Keatch, c/o Keatch Chemicals, Unit 27, Frederick St Centre, Aberdeen AB2 1HY (GB)

(*) Notice: Subject to any disclaimer, the term of this patent is extended or adjusted under 35 U.S.C. 154(b) by 216 days.

(21) Appl. No.: 09/686,428

(22) Filed: Oct. 11, 2000

Related U.S. Application Data

(63) Continuation-in-part of application No. 09/053,462, filed on Apr. 1, 1998, now abandoned.

(30) Foreign Application Priority Data

Apr. 1, 1997 (GB) .......................................... 9706614

(51) Int. Cl.[7] ......................... G04B 19/26; G09B 23/00

(52) U.S. Cl. .......................... 368/16; 368/18; 434/284

(58) Field of Search ............................. 368/16–20, 28, 368/37; 434/282, 284

(56) References Cited

U.S. PATENT DOCUMENTS

| | | | | |
|---|---|---|---|---|
| 1,997,511 A | | 4/1935 | Canepa | 368/18 |
| 3,902,309 A | | 9/1975 | Torrence | 58/3 |
| 4,759,002 A | * | 7/1988 | Cash | 368/15 |
| 4,766,579 A | | 8/1988 | Sporring | 368/190 |
| 4,853,908 A | | 8/1989 | Bourquin et al. | 368/19 |
| 5,023,849 A | | 6/1991 | Vaucher | 368/15 |
| 5,086,416 A | * | 2/1992 | Dubois et al. | 368/18 |
| 5,086,417 A | * | 2/1992 | Kerr | 368/19 |
| 5,114,348 A | * | 5/1992 | Tzeng | 434/284 |
| 5,327,400 A | * | 7/1994 | Dubois | 368/19 |
| 5,475,655 A | * | 12/1995 | Kerr | 368/19 |

FOREIGN PATENT DOCUMENTS

| | | |
|---|---|---|
| CH | 688171 | 6/1997 |
| EP | 107177 | 5/1984 |
| WO | WO 94/03845 | 2/1994 |

* cited by examiner

*Primary Examiner*—Vit Miska
(74) *Attorney, Agent, or Firm*—Madson & Metcalf

(57) ABSTRACT

A moon-phase dial mechanism comprising two overlapping, rotatable discs behind a substantially circular window capable of exhibiting a representation of the phases of the moon in a lunar cycle.

20 Claims, 5 Drawing Sheets

MOON-PHASE DIAL MECHANISM

This is a Continuation-in-part of application Ser. No. 09/053,462, filed Apr. 1, 1998, abandoned.

FIELD OF THE INVENTION

The present invention relates to a mechanism which mimicks the illumination of the Moon as it passes through its various phases.

BACKGROUND OF THE INVENTION

The Moon has a significant physical influence on life on our planet due to its large size and its close proximity. At full moon it can reflect sufficient sunlight to light up the night. Its mass is great enough to distort the Earths shape and to produce tides in oceans and lakes. It also provides the main force that moves the poles of the Earth in the precession of the equinoxes. Its shadow on the earth at occasional times and places may obscure light from the Sun to produce solar eclipses. Though these influences on Earth may be subject to simple laws of physics and dynamics, we are only just beginning to understand how the Moon may influence the biology of life on our planet.

The calendar month is equivalent approximately to the period of revolution of the Moon around the Earth. This period (29 days 12 hours 44 minutes 2.8 seconds) is the synodic month and represents the time it takes for the Moon to pass through the sequence of phases from new to first quarter to full to third quarter to new again and make a complete revolution about the Earth with respect to the Sun.

The relative positions of the Sun, Earth and Moon affect the illuminated lunar image that is seen by an observer. The "New" phase occurs when the moon surface is in full shade and all three bodies are linearly aligned with the Moon positioned centrally. The phase "First Quarter" occurs when the half moon surface is in sunlight forming a semi-circular shape. This occurs as the moon revolves around the Earth with the Sun Earth Moon angle describing an approximate right angle. The phase "Full" occurs when the observed surface of the moon is fully illuminated by the Sun and again all bodies are linearly aligned but with the Earth centrally positioned. The phase "Third or last quarter" relates to a "halt moon" but this time the moon position is between the new moon and full moon (ie approximately one hundred and eighty degrees removed from the first quarter). The left hand side of the Moon is illuminated as observed from Earth whereas it is the right hand side which is illuminated at the first quarter. In between these points, the shape of the moon appears as illuminated crescents or is gibbous and various angles of tilt can be observed.

Conventional moon dials (as used on various moon-phase clocks and watches) may comprise a single disc printed with two circular moon shapes positioned at 180 degrees to one another rotating behind a shaped window whose shape masks the visible or partly visible moon as it rotates to give an impression of the lunar phase. The window shape is similar to an axehead positioned with the crescent "cutting edge" uppermost and semicircular convex and concave aides which represent shadow as the moon disc rotates clockwise west to east. A disadvantage of this mechanism is that, as the moon goes from the third quarter to full phase, the shape of the shadow does not accurately represent the shadow which is observed on a near spherical object such as the Moon. As the Moon is gibbous and approaches fullness the pattern of the illuminated Moon produced by this mechanism is still crescent-like whereas it is the shadow which should be crescent shaped. Similarly, as the full Moon phase ages further, the initial shadow effect produced by the Eastern semicircular edge of the window is incorrect in that the appearance of the Moon should only become crescent shaped after the shadow covers more than half of the visible surface of the moon.

A second conventional mechanism utilises a rotating globe, halt of which is painted white and the other half black. As this rotates, an accurate impression of lunar phase is displayed but the size of the sphere is a significant disadvantage.

A third conventional device is one in which the various phases of the moon are separately displayed around the circumference of a clock and a pointer indicates the particular phase at a given time. Again this method suffers the disadvantage relating to the size of the moon, since many separate moons have to be represented on the same dial.

SUMMARY OF THE INVENTION

The present invention seeks to overcome these disadvantages by providing a stationary lunar image which mimmicks the appearance of the actual lunar phase more closely. The invention allows the phase of the Moon to be represented more accurately for any day of the month.

Thus viewed from one aspect the present invention provides a moon-phase dial mechanism comprising:

a substantially circular window capable of exhibiting a visible representation of each of the phases of the moon in a lunar cycle; to the rear of the substantially circular window, a rotatable upper disc having a transparent area, a light area and a dark area; and to the rear of the rotatable upper disc, a rotatable lower disc having a light area and a dark area, wherein the upper and lower disc overlap so that the substantially circular window exhibits a visible representation of a phase of the moon being a combination of the light area and the dark area of the upper disc and the light area and the dark area of the lower disc exposed through the transparent area of the upper disc.

In accordance with the invention, as the upper and lower discs rotate, each of the phases of the moon in a lunar cycle are visible through the substantially circular window. The shading of each of the upper and lower discs and their alignment may be determined empirically and one example for illustrative purposes only is shown in the Figures attached hereto and described hereinafter.

In a preferred embodiment, the moon-phase dial mechanism further comprises: a back screen to the rear of the rotatable lower disc. Preferably the overlapping upper and lower disc are each fixed onto a separate retaining means (eg a central axle, one or more retaining pillars or a retaining ring) attached to the back screen. The upper disc may be positioned above the lower disc so as to overlap by an amount slightly less than a radius.

The rotatable upper and lower discs may be rotatably driven by any known suitable driving means. Such driving means may be capable of mechanically cooperating with said discs eg one or more cogs, gears, cams and the like.

Preferably each of the upper and lower disc is fitted rearwardly with at least one disc cog. For example, each disc cog may be mounted on separate retaining means (eg a central axle). In this arrangement, each of the upper and lower disc is conveniently driven in the same direction by a single driving cog which co-operates with each disc cog.

Preferably the moon-phase dial mechanism comprises a display screen incorporating the substantially circular window. Preferably the display screen is substantially the same shade as the dark shading on the upper disc and on the lower disc.

In a particularly preferred embodiment, the display screen further comprises an arc window and an edge of the upper or lower disc is printed with indicators of the days of the month (eg Arabic or Roman numerals or lettering), the arrangement being such that the arc window is capable of exhibiting each of the indicators of the days of the month. For example, the upper disc may have printed around the circumference the numbers 1-31 representing the days of the month.

The appropriate spacing of the indicators of the days of the month may be readily determined empirically so as to match the visible representation of the phase of the moon exhibited by the substantially circular window. For example, the circumference of the upper disc may be empirically calibrated using the known days of easily recognisable phases (eg full and new moon phases). Intermediate days of the month may be equally spaced between the selected calibrated days of the month.

If desired, the day of the month may be matched to the calendar month itself which may be printed on the display screen at the appropriate position alongside the arc window. The actual position of the printed calendar month has to take into account the difference between the lunar cycle and the variable number of days of each calendar month. The variable length of the calendar month may be allowed for in the simplest form by empirically determining the correct position of the calendar month labels on the display screen. Alternatively, the mechanism could be fitted with a series of gears to compensate for the difference and additional gears. A similar adjustment could enable the year to be indicated.

In one embodiment of the invention, the moon-phase dial movement of the invention is used as a lunar display on watches or clocks.

Thus viewed from a further aspect the present invention provides a time-piece (eg a clock or watch) comprising a moon-phase dial mechanism as hereinbefore defined together with a time-piece movement.

A series of cogwheels and gears may be utilised to pair the watch or clock movement with the moon-phase dial mechanism of the invention. As an example, a cog on a clock movement whose period is one day can drive a series of cogs whose end result is a gear ratio of about 1:29:5306 so that the overlapping dials rotation is equivalent to the synodic month.

BRIEF DESCRIPTION OF THE DRAWINGS

A specifically preferred embodiment of the moon-phase dial mechanism of the invention will now be described with reference to the accompanying drawings in which.

DESCRIPTION OF THE PREFERRED EMBODIMENT

Figure 1B:
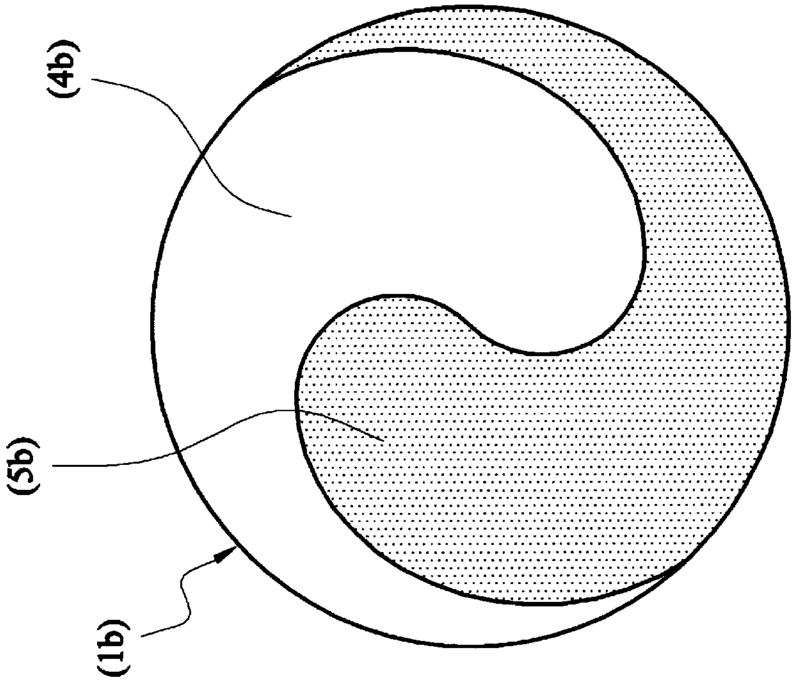
FIG. 1*b* illustrates a lower disc of the moon-phase dial mechanism.
Figure 1A:
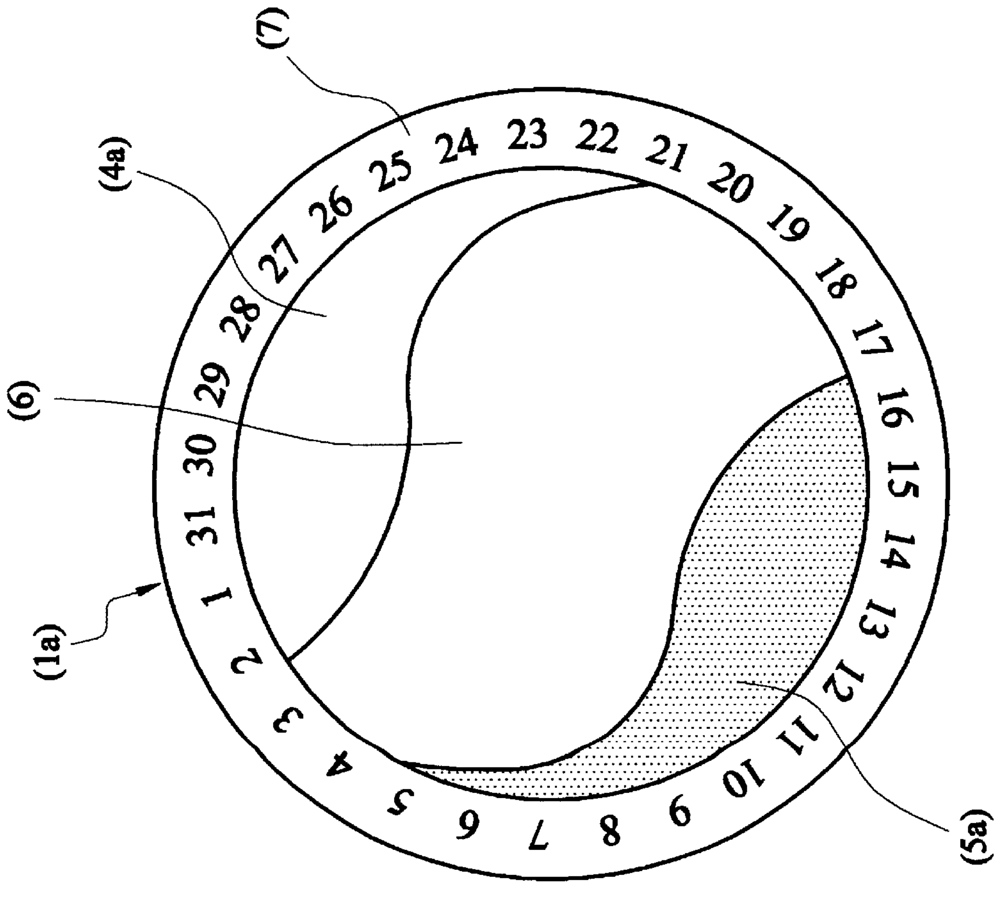
FIG. 1*a* illustrates an upper disc of the moon-phase dial mechanism.

The moon-phase dial mechanism comprises two overlapping discs (an upper disc (1*a*) and. a lower disc (1*b*)) which are illustrated from the front in FIGS. 1*a* and 1*b*. The upper disc (1*a*) has a transparent area (6) and is printed with a specially shaped light area (4*a*) and dark area (5*a*). The lower disc (1*b*) is also printed with a specially shaped light area (4*b*) and dark area (5*b*). Around the edge (7) of the upper disc (1*a*) are printed Arabic numerals representing the days of the month.

Figure 2:
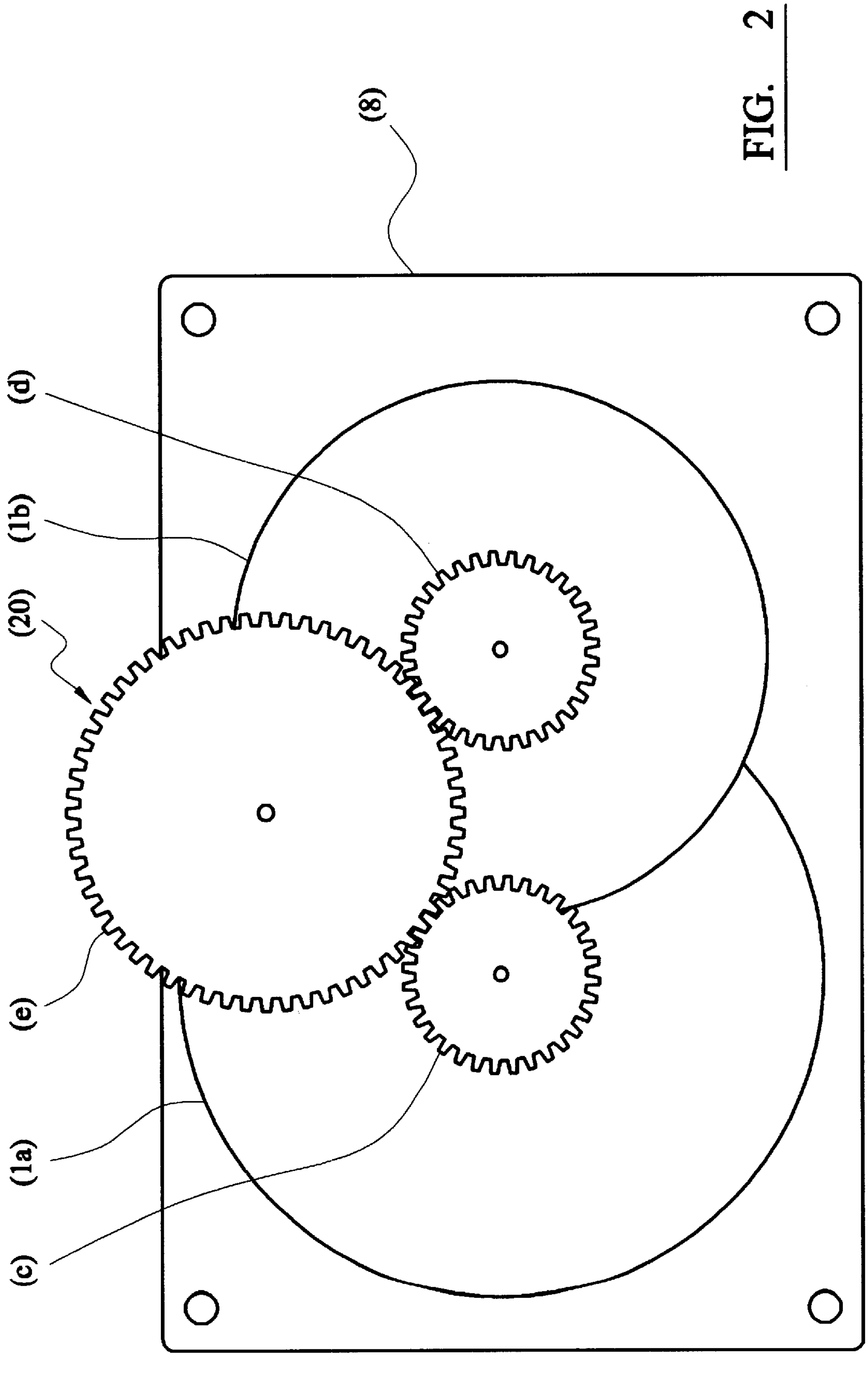
FIG. 2 illustrates a drive mechanism from the rear of the moon-phase dial mechanism.
Figure 3:
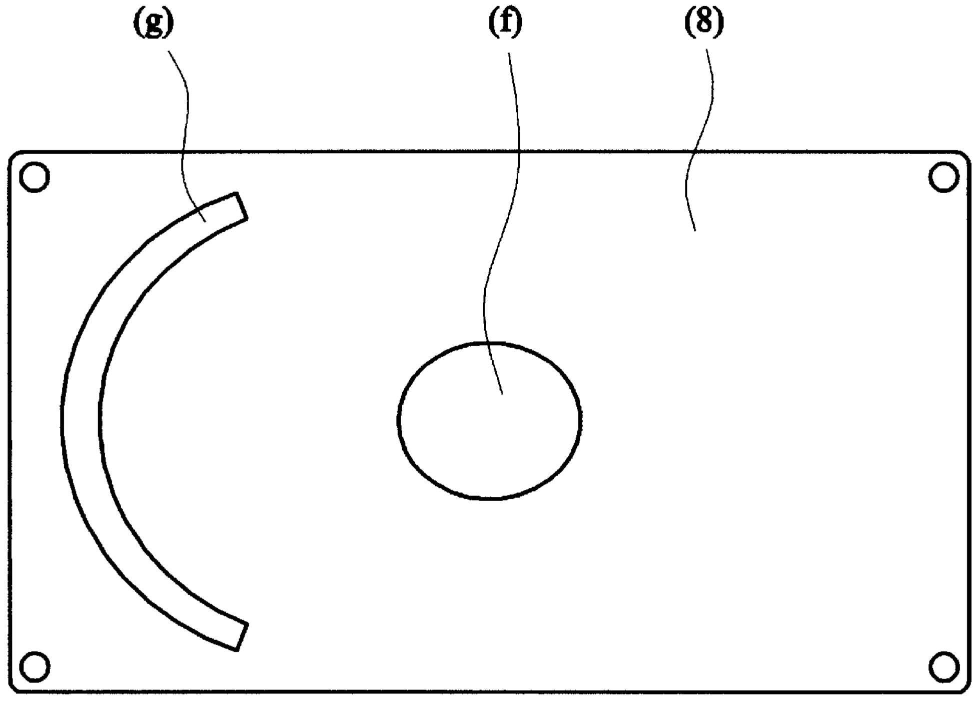
FIG. 3 illustrates a display screen of the moon-phase dial mechanism.

As will be apparent from the rear view of the moon-phase dial mechanism in FIG. 2, the upper disc (1*a*) and the lower disc (1*b*) are fixed onto the ends of separate axles and fitted rearwardly with a cog (c) and (d) respectively. Each disc is made to turn in the same direction by means of a substantially centrally positioned drive cog (e). The disc cogs ((c) and (d)), the drive cog (e) and discs (1*a* and 1*b*) are disposed rearwardly of a display screen (8) described in detail hereinafter. The drive cog (e) can be manually driven by a force applied to an edge (20) exposed outwardly from an edge of the display screen (8).

Figure 4:
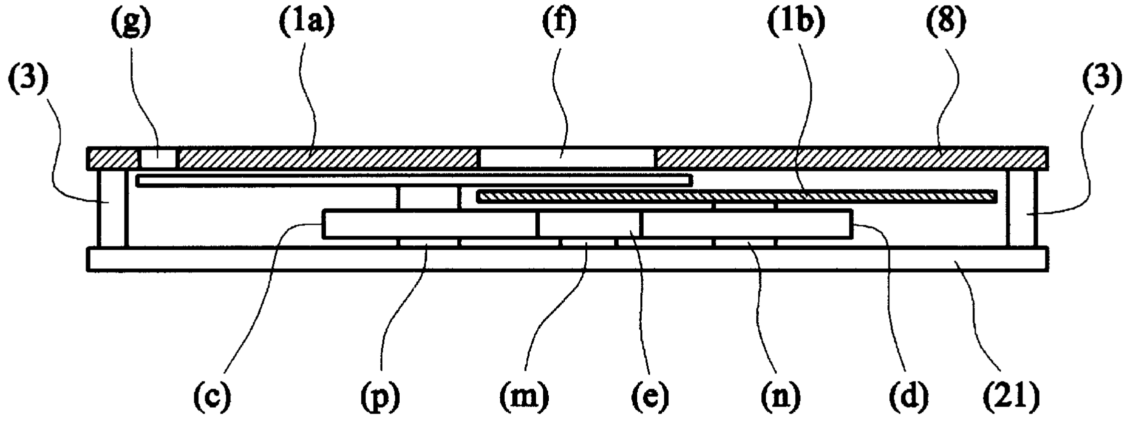
FIG. 4 illustrates a section a through the moon-phase dial mechanism.

As illustrated in FIG. 4, the embodiment comprises a back screen (21) to which are attached axles (m), (n) and (p) upon which each cog (e), (d) and (c) respectively are independently mounted. The display screen (8) and the back screen (21) are attached to each other by spacers (3) so as to sandwich the discs and the cogs. The display screen (8) masks the majority of the rotating upper and lower discs with the exception of (1) a substantially circular window (f) capable of exhibiting representations of the Moon and (2) an arc window (g) on the display screen (8) which allows the numerals representing the days of the month around the edge (7) of the upper disc (1*a*) to be visible.

The upper disc (1*a*) is positioned above the lower disc (1*b*) so as to overlap by an amount slightly less than a radius. Each disc (1*a* and 1*b*) is driven at the same rate and in the same direction by manual operation of the drive cog (e). The substantially circular window (f) of the display screen (8) is positioned almost centrally between the upper and lower discs (1*a* and 1*b*) so that as the discs rotate the pattern visible in the circular window (f) is that of the complete lunar cycle. In other words, the shading and alignment of the upper and lower disc is such that the pattern visible in the substantially circular window (f) is a combination of the light area (4*a*) and dark area (5*a*) of the upper disc (1*a*) and the light area (4*b*) and dark area (5*b*) of the lower disc (1*b*) exposed through the transparent area (6) of the upper disc (1*a*).

Figure 5:
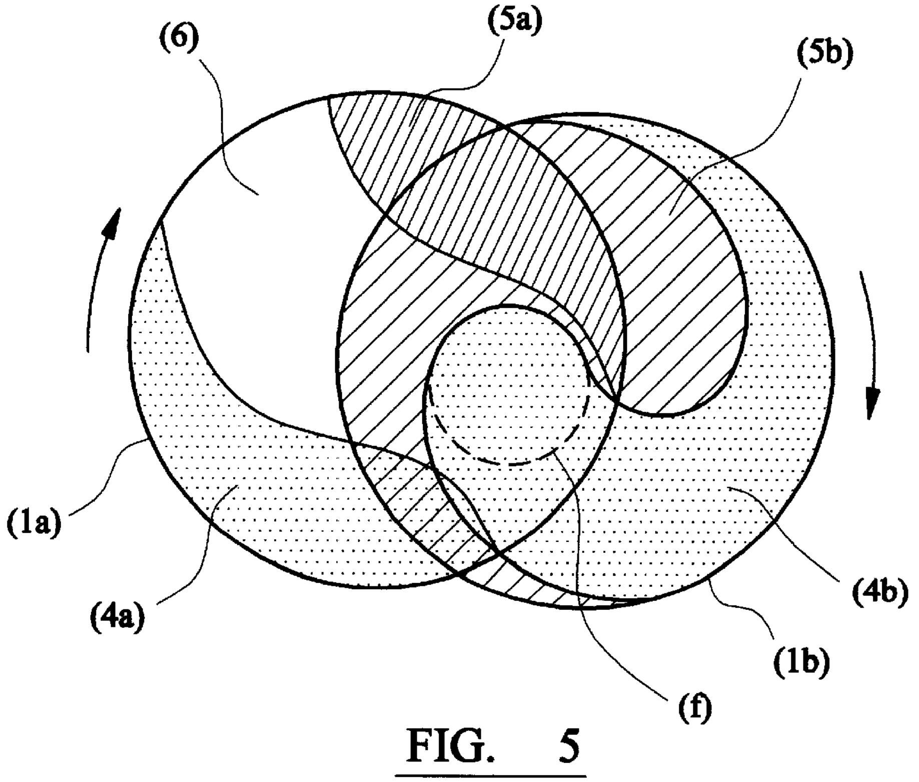
FIGS. 5 to 7 illustrate schematically the alignment of discs in the moon-phase dial mechanism.
Figure 6:
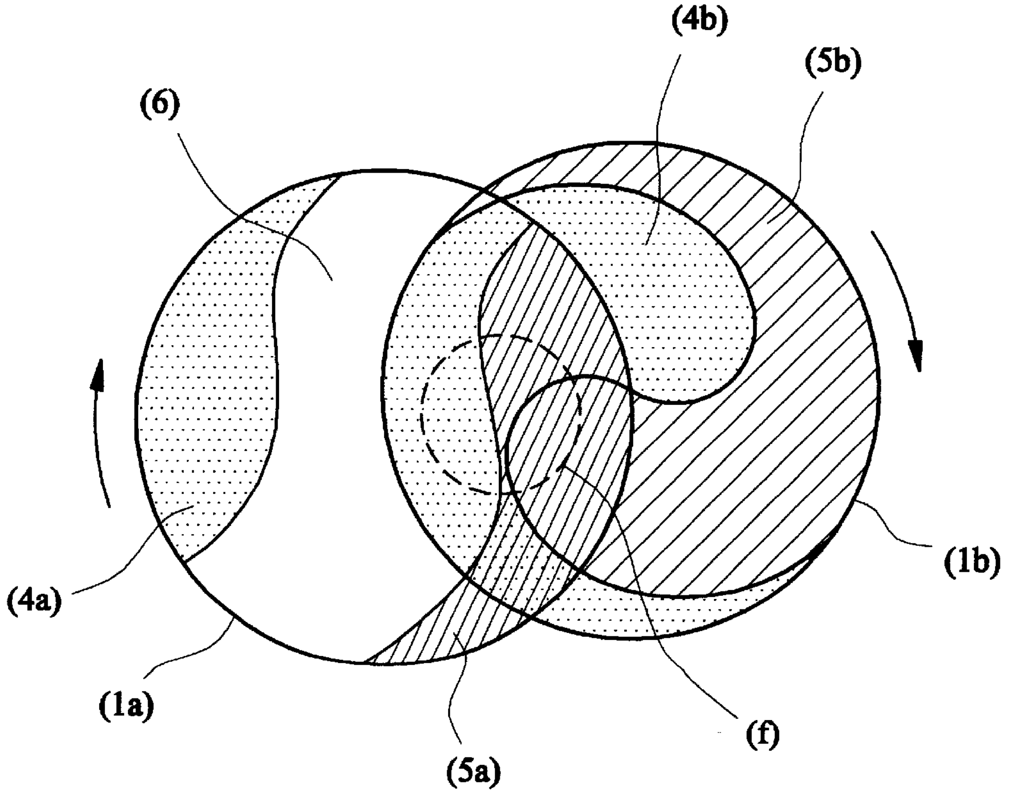
Figure 7:
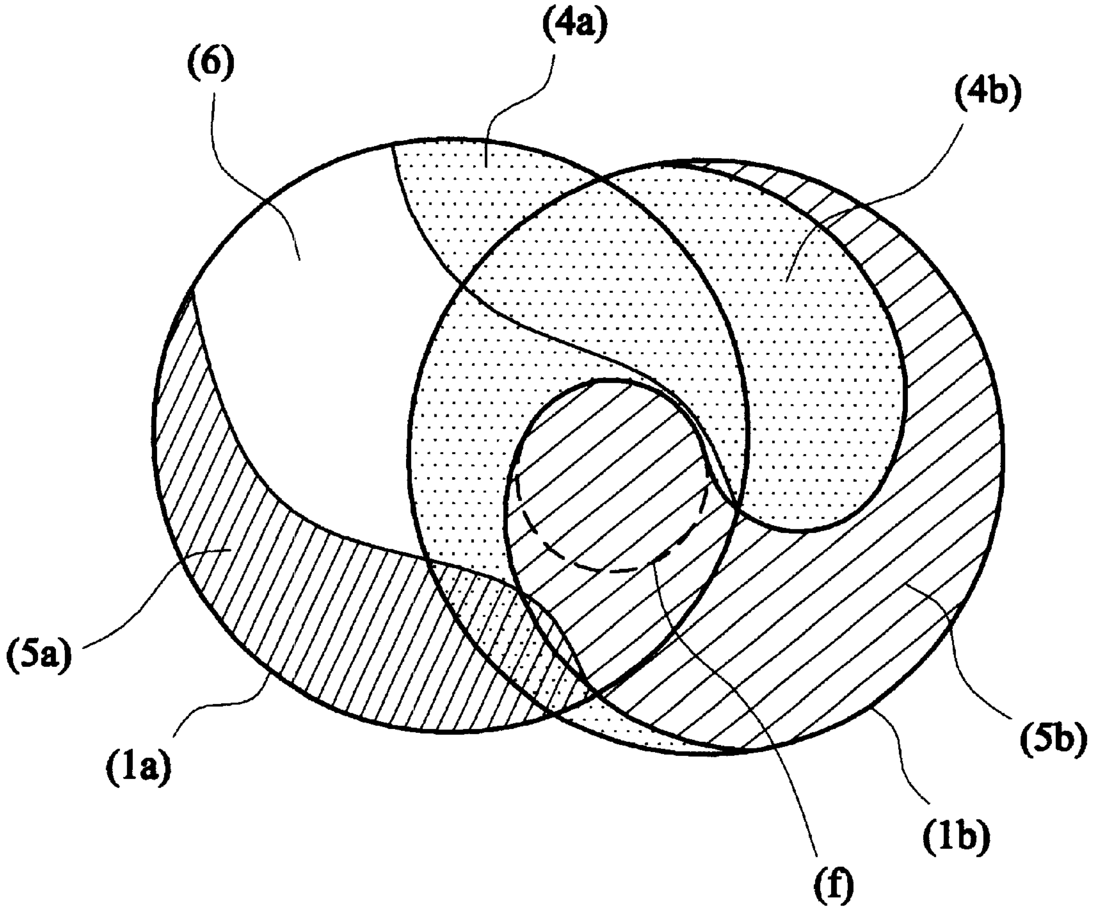

The correct alignment and shading of the upper disc (1*a*) and lower disc (1*b*) may be determined empirically and is exemplified schematically with reference to FIGS. 5 to 7. Firstly the lower disc (1*b*) is positioned so that the curved tail of the dark area (5*b*) lies on the circumference of the upper left hand quadrant of the substantially circular window (f) (shown in outline). As the discs rotate in a clockwise direction, the light area (4*b*) fills the substantially circular window (f) and is visible through the transparent area (6) of upper disc (1*a*). The dark area (4*a*) of the upper disc (1*a*) is increasingly visible in the substantially circular window (f) as a thin dark crescent which becomes fatter as the discs rotate. Finally the dark area (4*a*) is visible through half of the substantially circular window (f) in an almost straight vertical line. At this position, the lower disc (1*b*) has rotated so that the leading edge of the "head" of the dark area (5*b*) is almost aligned with the trailing (fat) edge of the dark area (5*a*) on upper disc (1*a*). Further rotation causes dark area (5*b*) to emerge from beneath the dark area (5*b*) of lower disc (1*b*) to exhibit a crescent moon in the substantially circular window (f) (see FIG. 6). The discs rotate further until a new moon is exhibited by the substantially circular window (f) (see FIG. 7).

If desired a month label may be printed onto the display screen (8). The matching of the month label and the numerals representing the days of the month around the circumference (7) of the upper disc (1$a$) may be determined empirically. For example, the numbers 1 to 31 may be equally spaced around the circumference (7) of upper disc (1$a$). The numbers are positioned so that when the substantially circular window (f) exhibits a full moon, the known day of the full moon in January is visible at the lower end of the arc window (g). The arc window (g) is of sufficient extent to permit the days of all the full moons in a calendar year to be visible. The days of all full and new moon phases are collated. Firstly the dials are rotated until a full moon is exhibited by the substantially circular window (f). The month labels are then positioned on the display screen (8) opposite the corresponding day labels visible through the arc window (g). The discs are then rotated until a new moon is exhibited by the substantially circular window (f). The days indicated in the arc window (9) are checked against the known dates of the new moon for that year and if necessary corrected by moving the month label or day label to get a close fit. In this manner, the observed pattern should be accurate to within a day for the entire lunar cycle.

The mechanism as described is envisaged as a simple pocket moon phase calendar but provision of additional cogs would allow lunar phases to be accurately displayed over an extended period of years.

We claim:

1. A moon-phase dial mechanism comprising:

a substantially circular window capable of exhibiting a visible representation of each of the phases of the moon in a lunar cycle;

to the rear of the substantially circular window, a rotatable upper disc having a transparent area, a light area and a dark area; and to the rear of the rotatable upper disc, a rotatable lower disc having a light area and a dark area, wherein the upper and lower disc overlap so that the substantially circular window exhibits a visible representation of a phase of the moon being a combination of the light area and the dark area of the upper disc and the light area and the dark area of the lower disc exposed through the transparent area of the upper disc.

2. A mechanism as claimed in claim 1 wherein the upper and lower discs are rotatable in the same direction.

3. A mechanism as claimed in claim 1 further comprising: a back screen to the rear of the rotatable lower disc.

4. A mechanism as claimed in claim 3 wherein the overlapping upper and lower disc are fixed to separate retaining means attached to the back screen.

5. A mechanism as claimed in claim 4 wherein the retaining means is a central axle.

6. A mechanism as claimed in claim 1 wherein the upper disc is positioned above the lower disc so as to overlap by an amount slightly less than a radius.

7. A mechanism as claimed in claim 1 wherein each of the upper and lower disc is fitted rearwardly with at least one disc cog.

8. A mechanism as claimed in claim 5 wherein each of the upper and lower disc is fitted rearwardly with at least one disc cog, each disc cog being mounted on the separate central axles attached to the back screen.

9. A mechanism as claimed in claim 8 wherein each of the upper and lower disc is driven in the same direction by a single driving cog which co-operates with each disc cog.

10. A mechanism as claimed in claim 9 wherein the single driving cog is capable of being driven by a force applied to an edge exposed outwardly from an edge of the display screen.

11. A mechanism as claimed in claim 1 comprising a display screen incorporating said substantially circular window.

12. A mechanism as claimed in claim 11 wherein the display screen comprises an arc window and a part of the surface of the upper or lower disc is printed with indicators of the days of the month, the arrangement being such that the arc window is capable of exhibiting each of the indicators of the days of the month.

13. A mechanism as claimed in claim 12 wherein the upper disc has printed around its circumference each of the numbers 1 to 31 whereby the mechanism is capable of exhibiting a visible representation of each of the phases of the moon in a lunar cycle together with an indicator of the day of the month.

14. A mechanism as claimed in claim 13 wherein the display screen has printed on its front surface the months of the year whereby the mechanism is capable of exhibiting a visible representation of each of the phases of the moon in a lunar cycle together with an indicator of the day of the month and the month.

15. A time-piece comprising a moon-phase dial mechanism as claimed in claim 1 together with a time piece movement.

16. A time-piece as claimed in claim 15 being a clock or watch.

17. A time-piece as claimed in claim 16 comprising means for engaging the moon-phase dial mechanism with the time-piece movement.

18. A time-piece as claimed in claim 17 wherein said engaging means is capable of driving said moon-phase dial mechanism.

19. A time-piece as claimed in claim 18 wherein said engaging means is one or more of the group consisting of cogs, gears and cams.

20. A time-piece as claimed in claim 19 wherein said time-piece movement comprises a cog with a period of one day and said engaging means is a plurality of cogs with a gear ratio substantially of 1:29:5306.

* * * * *